United States Patent [19]
Tkacik et al.

[11] Patent Number: 5,228,994
[45] Date of Patent: Jul. 20, 1993

[54] COMPOSITE MICROPOROUS MEMBRANES

[75] Inventors: Gabriel Tkacik, Bedford; Andrew J. Bartlett, Lowell, both of Mass.

[73] Assignee: Millipore Corporation, Bedford, Mass.

[21] Appl. No.: 960,047

[22] Filed: Oct. 13, 1992

[51] Int. Cl.⁵ .............................. B01D 61/18
[52] U.S. Cl. .................. 210/500.29; 210/500.36; 210/500.39; 210/500.4; 210/500.41; 210/500.43; 210/500.34

[58] Field of Search ............... 210/634, 644, 649–654, 210/321.6, 321.72, 321.75, 321.84, 500.21, 500.27, 500.28–500.43

[56] References Cited

U.S. PATENT DOCUMENTS 4,933,081 1/1990 Sasaki et al. ............... 210/500.41

*Primary Examiner*—Frank Sever
*Attorney, Agent, or Firm*—Andrew T. Karnakis; Paul J. Cook

[57] ABSTRACT

A composite microporous membrane is provided having a microporous nonretentive substrate and a retentive microporous layer coated directly to the substrate in the absence of an intermediate support layer.

27 Claims, 1 Drawing Sheet

COMPOSITE MICROPOROUS MEMBRANES

BACKGROUND OF THE INVENTION

This invention relates to composite microporous filtration membranes and to a process for producing the membranes. More particularly, this invention relates to composite microporous membranes made from a permeable nonretentive microporous substrate with a thin retentive microporous layer.

Microporous and open ultrafiltration membranes include thin sheets and hollow fibers generally formed from synthetic thermoplastic materials and having a substantially continuous matrix structure containing open pores or conduits of small size. The mean pore size range for pores of "microporous membranes" is not precisely defined in the art, but it is generally understood to extend from about 0.01 microns to about 10 microns. Microporous membranes having open pores thereby imparting permeability are useful in fine filtration. Ultrafiltration (UF) membranes have an average pore size less than that of microporous membranes and therefore are more retentive than microporous membranes.

Composite ultrafiltration (UF) membranes are UF membranes formed on a pre-existing microporous membrane substrate. The composite membranes have better integrity (higher bubble points) than UF membranes cast from the same polymer solutions onto traditional non-woven backing materials such as a non-woven polyester substrate. It is also disclosed in U.S. Pat. No. 4,770,777 to form a polyamide composite microporous membrane. A first layer of a polyamide solution is cast on a support and a fabric then is imbedded into the polyamide layer. A second layer of polyamide solution then is cast onto the fabric in the first polyamide layer. The first and second layers are then coagulated to form a microporous composite membrane where the pores in the first layer are larger than the pores in the second layer. The presence of the fabric layer is undesirable since it increases the risk of creating a non-retentive conduit in the composite membrane. It is also known to provide a composite membrane having a microporous layer and an ultrafiltration layer as disclosed, for example, in U.S. Pat. No. 4,824,568.

Most microfiltration membranes are manufactured by the so called immersion casting process. In this process, a polymer solution is cast into a film and immersed in a nonsolvent immersion bath. The polymer precipitates in this non-solvent and forms a porous structure. The pore sizes throughout the depth of this structure are determined by the formulation of the casting solution, properties of the non-solvent immersion bath and the parameters of the casting process. The filtration properties of these filters depend on the number of pores and the distribution of pore sizes. The process can lead to essentially isotropic structures where the distribution of pore size is approximately the same throughout the whole membrane depth from one surface of the membrane to the other surface. An example of isotropic microfiltration membranes is the Durapore product line to Millipore Corporation manufactured according to U.S. Pat. No. 4,203,847. In certain cases, the formulation of casting solution or the design of the casting process lead to anisotropic structures where distribution of pore sizes changes from one surface of the membrane to the other. An example of such membrane is the Filterite membrane marketed by Memtek USA, manufactured according to U.S. Pat. No. 4,629,563. The pore size in this membrane type change monotonically from one surface to the other. Another example of an anisotropic membrane is described in U.S. Pat. No. 4,933,081. The pore sizes in that membrane decrease from one membrane surface, reach a minimum inside the membrane structure and again increase toward the other surface of the membrane. Microfiltration membranes are used in general for separation of particles and colloidal matter from fluids. To accomplish this separation, they must contain within their structures at least one layer of pores capable of retaining the particulate matter and they must be mechanically strong to endure typical stresses associated with handling in device manufacturing and with the flow of fluids through their structure. A typical goal of membrane filter improvements is an increase of permeability at equivalent retention or vice versa. In general, small pores lead to a better retention but lower permeability. One way to improve performance is to decrease the thickness of the retentive part of membrane structure, containing typically the smallest pores. However, to maintain the mechanical strength, other layers of the membrane have to be present. These layers decrease the permeability of the membrane.

Accordingly, it would be desirable to provide composite microporous membranes which are retentive while maintaining high permeability of the composite membrane. In addition, it would be desirable to control independently the characteristics of a retentive layer and a nonretentive layer of a composite microporous membrane wherein the desired retentive characteristics can be maintained without adversely affecting the permeability of the nonretentive layer and while retaining structural integrity during use.

SUMMARY OF THE INVENTION

The present invention provides composite microporous membranes comprising a nonretentive microporous substrate and a thin retentive microporous layer bonded to the microporous substrate. A polymeric microporous membrane is provided which functions as a nonretentive substrate layer thereby to provide high overall permeability of the composite. A solution is cast as a thin layer onto the substrate and then is contacted with a nonsolvent of the polymeric composition in solution to effect coagulation and formation of the thin microporous retentive layer can be controlled by controlling the layer thickness and the concentration of the polymeric composition in the originally applied polymeric solution. The higher the concentration, and the greater the thickness, the greater the retentive capacity of the composite membrane. The composite membranes of this invention have a retentive layer between about 2 and 40 microns thick. The composite membrane of this invention exhibit retention about an order of magnitude higher as compared to a monolayer microporous membrane having comparable water fluxes. The water fluxes of the composite membranes of this invention are about two times higher than a monolayer composite membrane having similar isopropanol bubble points.

DESCRIPTION OF SPECIFIC EMBODIMENTS

Figure 1:
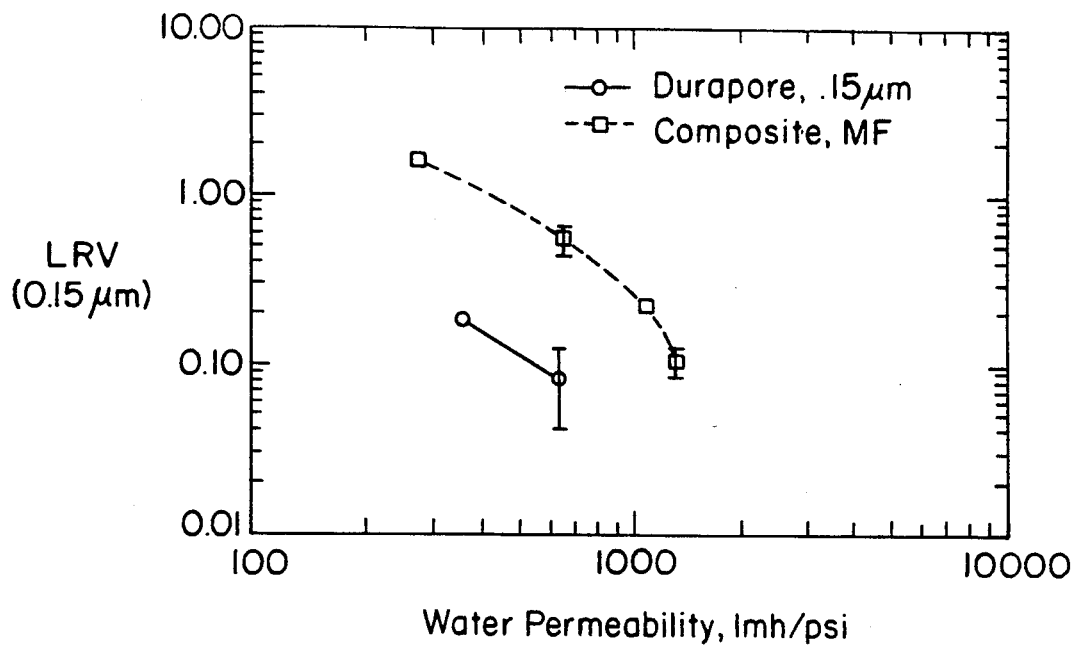
FIG. 1 is a graph illustrating the retentive characteristic of the membranes of this invention compared to monolayer microporous membranes, using 0.15 $\mu$m polystyrene latex particles.

The term "nonretentive" or "nonretentive layer" as used herein means that the function of the substrate layer is not to retain any retentate components but to function as a permeable layer which provides structural integrity for the retentive layer. The term "retentive layers" or "retentive" refers to the microporous layer which functions to retain a retentate component while permitting through passage of a filtrate.

The composite membrane of this invention comprises a microporous retentive layer bonded to a nonretentive microporous polymeric membrane substrate. The microporous membrane substrate has a pore size range of between about 0.2 and 10 microns.

In a first step in the process for making the microporous composite membranes of this invention, a microporous nonretentive membrane substrate is provided. The membrane substrate can be formed by any conventional process available for forming a microporous membrane such as by coating a solution of a polymeric composition followed by coagulating.

A microporous retentive layer is formed upon the microporous membrane substrate. This can be done by coating a solution of a polymeric composition onto the microporous membrane substrate followed by coagulating the polymeric composition such as by immersing the coated substrate into a liquid which is miscible with the solvent for the polymeric composition but is a nonsolvent for the polymeric composition. The solution forming the retentive layer should have a viscosity of at least about 50,000 centipoise, preferably at least about 70,000 centipoise. Alternative suitable coagulation procedures include contact of the polymeric composition solution with humid air, evaporation of solvent, or change of temperature. The thickness of the solution is such as to attain a microporous retentive layer between about 2 and 40 microns, preferably between about 2 and 20 microns. The average pore size of the retentive layer is between about 0.01 and 10 microns, preferably between about 0.01 and 0.4 microns.

In an alternative embodiment, solutions for the retentive layer and the nonretentive layer can be coextruded to form the laminate which then is coagulated to form the two microporous layers.

The composite membranes of this invention are characterized by higher permeabilities as compared to monolayer microporous membranes formed of essentially the same composition and having essentially the same bubble point as the retentive layer of the composite membrane of this invention. Generally the improved permeability of the membranes of this invention is at least about two times as large as the permeability of the monolayer microporous membrane having essentially the same composition and essentially the same bubble point as the retentive layer of the composite membrane of this invention.

An example of a coating technique for the polymer solution is the process disclosed in U.S. Pat. No. 5,017,292, the teachings of which are incorporated herein by reference. Other coating techniques could be employed such as knife on a roll or die extrusion. Polymer solutions containing between about 5 and 30%, by weight, of a polymeric composition in a solvent system can be employed.

Suitable liquids which are miscible with the polymer solvent include water which is generally the preferred liquid, although other liquids can be employed. For example, alcohols, water-alcohol mixtures, water-polymer solvent, water-glycerine mixtures can be employed. The composite microporous membranes of this invention can be formed of any polymeric composition capable of producing a microporous membrane layer. Representative suitable polymers include polyvinylidenefluoride, polysulfone or polyethersulfone; polyamides; cellulose acetate, cellulose nitrate, polyimide, polyetherimide, polycarbonate, polyacrylonitrile or a polyolefin, copolymers or the like.

The precipitated polymeric composition forms a microporous membrane layer. The properties of the membrane can be varied by controlling such parameters as the percent polymer in solution, solvent type, pore forming additives, coating thickness, immersion bath composition, immersion bath temperature, etc.

After the microporous composite membrane structure has formed, it can be washed by conveying the coated and precipitated web through a water bath. Contact time of approximately one minute in 25° C. water, for example, is sufficient.

Drying can then be performed by leaving the washed web to dry as single sheets at room temperature. Alternatively, the web can be continuously dried by conveying the web over a perforated roll. The interior of the roll is maintained at subatmospheric pressure and a heated air stream (e.g., 130° F.) is impinged on the surface of the web. A typical speed for the web over such a roll is about 2 to 20 feet per minute.

The following examples illustrate the present invention:

TEST METHODS

Water permeability

A 47 mm disk of the membrane sample is pre-wet by immersion in isopropanol, washed in deionized water and mounted in a holder. Deionized water is flown through the disk sample at a constant pressure of 13.2 psi. The time and the volume of water passed through the sample are measured and the permeability P is calculated as $$P = \frac{\text{Volume}}{\text{Time} \times \text{Area} \times \text{Pressure}}$$

A common unit of water permeability is liter/(m2.-hour.psi) or (lmh/psi).

Air permeability

A 25 mm disk of a dry membrane sample is mounted in a holder, pressurized with dry, filtered air and the flow of air is measured upstream of the sample using a calibrated mass flow meter. The permeability is expressed as a flow rate in standard cubic feet of air at a pressure of 1 psi across the membrane (scfm/psi, 25 mm disk).

Porosimetry bubble point

A 25 mm disk of a dry membrane sample is mounted in a holder, dry and wet air flow is measured as described in ASTM method F316-80. The bubble point is defined as the pressure at which a first non-linear increase of wet air flow is detected by the flow meter. Isopropanol is used to wet the filter sample before and during the wet air flow measurement.

Fluorescent polystyrene latex particle retention

A 47 mm disk of the membrane sample is immersed in isopropanol, washed in water and mounted in a holder. A suspension of monodisperse fluorescent polystyrene particles suspended in 0.1% solution of surfactant Triton X100 in water is injected into a stream of blank surfactant solution being pumped through the filter at a constant flow rate of 30 ml/min by a chromatographic pump. The total number of injected particles corresponds to one full monolayer coverage of the membrane sample. The particles which pass through the membrane are detected by a HPLC fluorescence detector as a permeate signal peak. The experiment is repeated with the membrane sample taken out of the holder and a signal peak of the total particle challenge is recorded. The ratio of particle numbers in the challenge solution to the number of particles in the permeate ($n_c/n_p$) is calculated from the ratio of areas of the corresponding recorded peaks. The retention is expressed as a log-reduction value (LRV) defined as $LRV = -\log(n_c/n_p)$. Two sizes of monodisperse particles (0.15 micrometer and 0.23 micrometer) were used in separate retention experiments.

EXAMPLE 1

Polyvinylidenefluoride (PVDF) microfiltration membranes having an average pore size of 0.65 μm and an isopropanol bubble point of 5 to 8 psi were employed as the performed microporous membrane substrate.

A polymer solution was made of 21 wt. % PVDF, 5% lithium chloride and N-methyl-2-pyrrolidone (NMP). Viscosity of the solution at 25° C., measured with Brookfield viscometer, was 85 Pa.s. The solution was cast onto the membrane substrate at a speed of 10 feet/min. utilizing an applicator of U.S. Pat. No. 5,017,292, with pressure on the coating cylinder determining the thickness of the coating. The coated substrate membrane was then immersed into a methanol immersion bath at a temperature of 20° C. for 1 min. The composite membrane thus produced was extracted by immersion in water bath maintained at 25° C. for 2 min. to remove the residual extractable components and was subsequently dried by conveying the washed membrane over a perforated drying roll with sub atmospheric pressure inside and air heated to 130° F. impinging onto the surface of the membrane on the outside of the roll, moving at a speed of 10 feet per minute. Composite microfiltration membrane samples were produced with thickness of the second layer in the range of 2 to 40 micrometers, controlled to ±2 microns. The samples were characterized by water permeability, porosimetry bubble points and fluorescent polystyrene latex particle retention.

Figure 2:
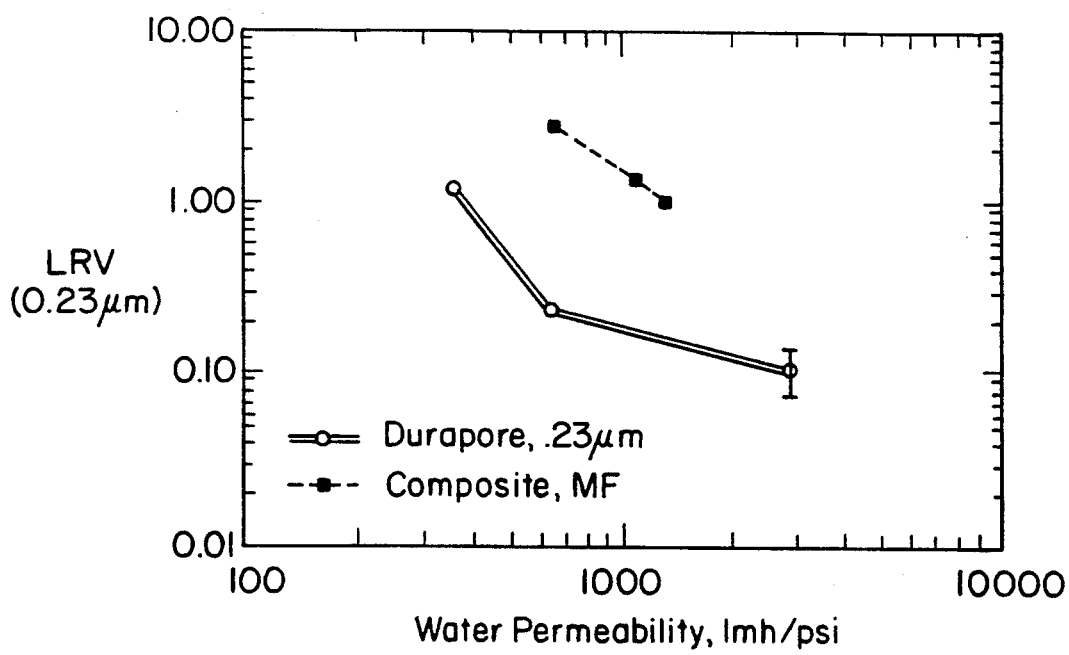
FIG. 2 also is a graph illustrating the retentive characteristic of the membranes of this invention compared to monolayer microporous membranes, using 0.23 μm polystyrene latex particles.

The porosimetry bubble points of the samples were in the range of 15 to 60 psi, increasing with the increasing thickness of the second layer. The water permeabilities were at least two-times higher than the permeability of conventional monolayer PVDF membrane with equivalent bubble point. The retentive properties and water permeabilities are shown in FIGS. 1, 2, compared to a commercial hydrophobic grades of conventional monolayer PVDF microfiltration membrane of the Durapore series (membranes with pore size rating 0.1, 0.22 micrometers are represented in FIG. 1, membranes with pore size rating 0.1, 0.22, 0.45 micrometers are represented in FIG. 2) It is evident that the composite microfiltration membranes exhibit approximately an order of magnitude higher LRV values than the conventional membranes with comparable water permeabilities, or, conversely, composite microfiltration membranes exhibit water permeabilities at least two-times higher than the conventional membranes with equal retention values.

EXAMPLE 2

Composite microfiltration membrane sample was made as in Example 1, except a polyethylene microfiltration membrane with an isopropanol bubble point of 7 psi was used as the performed membrane substrate. The thickness of the second layer was 20 micrometers. The following values of water permeability and porosimetry bubble point were measured for this composite PVDF/PE microfiltration membrane sample:

| Sample | IPA BP | Water permeability |
| --- | --- | --- |
| Composite PVDF/PE | 32 psi | 510 lmh/psi |
| Conventional monolayer PVDF | 31 psi | 230 lmh/psi |

EXAMPLE 3

A polymer solution consisting of 20 wt. % polyethersulfone Victrex 4100, 10 wt. % polyvinylpyrrolidone (average MW 360000 Da) was made in N-methyl-2-pyrrolidone. The solution was used to prepare a composite microfiltration membrane sample as in Example 1, except 35 vol. % NMP in methanol was used in the immersion bath. The thickness of the second layer of this PES/PVP/PVDF composite membrane was 20 micrometers. The properties compared to a conventional monolayer PVDF microfiltration membrane were as follows:

| Sample | IPA BP | Air permeability mm disk) |
| --- | --- | --- |
| Composite PES/PVP/PVDF | 51 psi | 0.026 scfm/psi |
| Conventional monolayer PVDF | 31 psi | 0.0082 scfm/psi |

EXAMPLE 4

A composite microfiltration membrane sample was prepared as in Example 3, except a polyethylene microfiltration membrane as in Example 2 was used as a substrate. The thickness of the second layer of this PES/PVP/PE composite membrane was 20 micrometers. The properties compared to a conventional monolayer PVDF microfiltration membrane were as follows:

| Sample | IPA BP | Air permeability mm disk) |
| --- | --- | --- |
| Composite PES/PVP/PE | 32 psi | 0.023 scfm/psi |
| Conventional monolayer PVDF | 31 psi | 0.0082 scfm/psi |

We claim:

1. A composite integral microfiltration membrane comprising a nonretentive nonfibrous microporous polymeric layer and a thin retentive microporous polymeric layer formed integrally on said nonretentive layer, said retentive layer having a pore structure finer than that of said nonretentive layer; said nonretentive layer and said retentive layer being preselected to provide properties for providing an alternative to a third layer therebetween and providing structural integrity to said membrane while maintaining desired retentive and permeability characteristics during use thereof.

2. The composite microfiltration membrane of claim 1 wherein said thin retentive layer has a thickness between about 2 and 40 micrometers.

3. The composite microfiltration membrane of claim 1 wherein the permeability of the said composite membrane is at least twice as large as the permeability of a monolayer membrane made of essentially the same polymer and having essentially the same bubble point as the thin retentive layer of the composite membrane.

4. The composite microfiltration membrane of claim 1 wherein the isopropanol porosimetry bubble point of said compsite membrane, tested with the tetnetive layer upstream, is between 10 and 60 psi.

5. The composite microfiltration membrane of claim 1 wherein the mean pore size of the nonretentive substrate layer is between 0.2 and 10 micrometers.

6. The composite microfiltration membrane of claim 1 wherein said retentive layer is formed of polyvinylidenefluoride.

7. The composite microfiltration membrane of claim 1 wherein said retentive layer is formed of polyethersulfone.

8. The composite microfiltration membrane of claim 1 wherein said retentive layer is formed of polysulfone.

9. The composite microfiltration membrane of claim 1 wherein said retentive layer is formed of a polyolefin.

10. The composite microfiltration membrane of claim 1 wherein said retentive layer is formed of cellulose.

11. The composite microfiltration membrane of claim 1 wherein said retentive layer is formed of cellulose acetate.

12. The composite microfiltration membrane of claim 1 wherein said retentive layer is formed of cellulose nitrate.

13. The composite microfiltration membrane of claim 1 wherein said retentive layer is formed of polyacrylonitrile.

14. The composite microfiltration membrane of claim 1 wherein said retentive layer is formed of polycarbonate.

15. The composite microfiltration membrane of claim 1 wherein said retentive layer is formed of polyamide.

16. The composite microfiltration membrane of claim 1 wherein said retentive layer is formed of polyimide.

17. The composite microfiltration membrane of claim 1 wherein said nonretentive layer is formed of polyvinylidenefluoride.

18. The composite microfiltration membrane of claim 1 wherein said nonretentive layer is formed of polyethersulfone.

19. The composite microfiltration membrane of claim 1 wherein said nonretentive layer is formed of polysulfone.

20. The composite microfiltration membrane of claim 1 wherein said nonretentive layer is formed of polyolefin.

21. The composite microfiltration membrane of claim 1 wherein said nonretentive layer is formed of cellulose.

22. The composite microfiltration membrane of claim 1 wherein said nonretentive layer is formed of cellulose acetate.

23. The composite microfiltration membrane of claim 1 wherein said nonretentive layer is formed of cellulose nitrate.

24. The composite microfiltration membrane of claim 1 wherein said nonretentive layer is formed of polyacrylonitrile.

25. The composite microfiltration membrane of claim 1 wherein said nonretentive layer is formed of polycarbonate.

26. The composite microfiltration membrane of claim 1 wherein said nonretentive layer is formed of polyamide.

27. The composite microfiltration membrane of claim 1 wherein said nonretentive layer is formed of polyimide.

* * * * *